(12) United States Patent
Ohtani et al.

(10) Patent No.: US 9,803,066 B2
(45) Date of Patent: Oct. 31, 2017

(54) CHOPPED CARBON FIBER BUNDLES AND METHOD FOR PRODUCING CHOPPED CARBON FIBER BUNDLES

(71) Applicant: Mitsubishi Chemical Corporation, Tokyo (JP)

(72) Inventors: Tadashi Ohtani, Toyohashi (JP); Takayuki Kiriyama, Toyohashi (JP); Yukio Nishimoto, Toyohashi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 14/647,343

(22) PCT Filed: Nov. 22, 2013

(86) PCT No.: PCT/JP2013/081478
§ 371 (c)(1),
(2) Date: May 26, 2015

(87) PCT Pub. No.: WO2014/081002
PCT Pub. Date: May 30, 2014

(65) Prior Publication Data
US 2015/0315364 A1 Nov. 5, 2015

(30) Foreign Application Priority Data
Nov. 26, 2012 (JP) ................................ 2012-257772

(51) Int. Cl.
| | | |
|---|---|---|
| D06M 15/227 | (2006.01) |
| D06M 15/507 | (2006.01) |
| D06M 15/55 | (2006.01) |
| D06M 15/59 | (2006.01) |
| D01F 11/00 | (2006.01) |
| D01F 11/10 | (2006.01) |
| C08K 7/06 | (2006.01) |
| B05D 3/12 | (2006.01) |
| B05D 1/28 | (2006.01) |
| B05D 1/18 | (2006.01) |
| B05D 3/04 | (2006.01) |
| C08J 5/06 | (2006.01) |
| D06M 15/564 | (2006.01) |
| C08J 5/24 | (2006.01) |
| D06M 101/40 | (2006.01) |

(52) U.S. Cl.
CPC .................. C08K 7/06 (2013.01); B05D 1/18 (2013.01); B05D 1/28 (2013.01); B05D 3/0406 (2013.01); B05D 3/12 (2013.01); C08J 5/06 (2013.01); C08J 5/24 (2013.01); D06M 15/227 (2013.01); D06M 15/507 (2013.01); D06M 15/55 (2013.01); D06M 15/564 (2013.01); D06M 15/59 (2013.01); D06M 2101/40 (2013.01); Y10T 428/2918 (2015.01)

(58) Field of Classification Search
CPC .. D06M 15/227; D06M 15/507; D06M 15/55; D06M 15/59; D01F 11/00; D01F 11/10
USPC ........ 524/495; 428/364, 367, 368, 372, 375, 428/378, 401
See application file for complete search history.

(56) References Cited

U.S. PATENT DOCUMENTS

2009/0162653 A1* 6/2009 Sakata ................... C08J 5/042
428/367
2012/0326342 A1* 12/2012 Tsunekawa ............ D02G 3/16
264/13

FOREIGN PATENT DOCUMENTS

| JP | 5-261729 A | 10/1993 |
|---|---|---|
| JP | 5-261730 A | 10/1993 |
| JP | 11-81146 A | 3/1999 |
| JP | 11-200160 A | 7/1999 |
| JP | 2000-303362 A | 10/2000 |
| JP | 2001-271230 A | 10/2001 |
| JP | 2003-165849 A | 6/2003 |
| JP | 2003-268674 A | 9/2003 |
| JP | 2004-11030 A | 1/2004 |
| JP | 2004-84133 A | 3/2004 |
| JP | 2006-144168 A | 6/2006 |
| JP | 2006144168 A * | 6/2006 |

(Continued)

OTHER PUBLICATIONS

Extended European Search Report dated Nov. 2, 2015 in Patent Application No. 13856572.6.
(Continued)

Primary Examiner — Matthew Matzek
(74) Attorney, Agent, or Firm — Oblon, McClelland, Maier & Neustadt, L.L.P.

(57) ABSTRACT

Provided are: chopped carbon fiber bundles which have high fluidity without decreasing the dispersibility of carbon fibers and the physical properties of a molded product; and a method for producing chopped carbon fiber bundles with high productivity. Chopped carbon fiber bundles, each of which contain a carbon fiber bundle having a total fineness of from 25,000 dtex to 45,000 dtex (inclusive) and a sizing agent in an amount of from 1% by mass to 5% by mass (inclusive) relative to the total mass of the chopped carbon fiber bundle. The length (L) of each chopped carbon fiber bundle along the fiber direction of the carbon fiber bundle is from 1 mm to 50 mm (inclusive); the ratio of the longest diameter (Dmax) to the shortest diameter (Dmin) of a cross section perpendicular to the fiber direction of each chopped carbon fiber bundle, namely Dmax/Dmin is from 6.0 to 18.0 (inclusive); and the orientation parameter of the single fibers present in the surface of each chopped carbon fiber bundle is 4.0 or less.

5 Claims, No Drawings

(56) References Cited

FOREIGN PATENT DOCUMENTS

| JP | 2010-126841 A | 6/2010 |
|---|---|---|
| JP | 2011-208285 A | 10/2011 |

OTHER PUBLICATIONS

"Epikote™Resins for Coating, Civil Engineering and Adhesive Applications" XP055120345, Dec. 31, 2004, 4 Pages.
"Epikote™Resin 828" Product Data Sheet, Resolution Performance Products, EK 1.1.78, XP055223250, Re-issued Oct. 2004, 2 Pages.
Notice of Reasons for Rescission dated May 26, 2016 in Japanese Patent Application No. 2013-555109 (with partial English language translation).
Masayoshi Washiyama, "Experimental Result Certificate" Toray Industries, Inc., Feb. 24, 2016, 8 Pages. (with English language translation).
Decision of Maintenance of Patent, JP2013-555109 (Japanese Patent No. 5772988), dated Sep. 28, 2016, with English-language translation.
Notice of Allowance dated Jun. 2, 2015 in Japanese Patent Application No. 2013-555109 with English translation.
International Search Report dated Feb. 18, 2014, in PCT/JP2013/081478, filed Nov. 22, 2013.
Notice of Reasons for Rescission dated May 26, 2016 in Japanese Patent Application No. 2016-700177 (with partial English language translation).

\* cited by examiner

CHOPPED CARBON FIBER BUNDLES AND METHOD FOR PRODUCING CHOPPED CARBON FIBER BUNDLES

TECHNICAL FIELD

The present invention relates to a chopped carbon fiber bundle appropriate for the production of a carbon fiber-reinforced plastic which uses a thermoplastic resin as a matrix, and a method for producing the chopped carbon fiber bundle. Particularly, the invention relates to a chopped carbon fiber bundle which employs a carbon fiber bundle having a large number of filaments and high total fiber fineness (so-called a large tow) as a raw material, and to a method for producing the chopped carbon fiber bundle. More particularly, the invention relates to a chopped carbon fiber bundle having excellent handleability such as fluidity and cohesion properties as a reinforcing material for a short fiber-reinforced resin molding material, and a method for producing the chopped carbon fiber bundle.

The present application claims priority based on Japanese Patent Application No. 2012-257772 filed in Japan on Nov. 26, 2012, the disclosure of which is incorporated herein by reference.

BACKGROUND ART

Carbon fiber-reinforced plastics have far superior strength, rigidity and dimensional stability compared with non-reinforced plastics, and therefore, carbon fiber-reinforced resins are widely utilized in various fields such as the fields of business equipment and automobiles. The demand for carbon fibers is increasing every year, and there has been a shift in the demands from premium applications such as aircraft and sporting goods to general industrial applications related to construction, civil engineering and energy industries. Therefore, the requirements for carbon fibers are also strict, and performance improvement as well as cost reduction has been a significant challenge to be addressed. For this reason, carbon fiber bundles having a larger number of filaments and having a higher total fiber fineness have been supplied in recent years, for the purpose of cost reduction.

In general, short carbon fiber-reinforced thermoplastics (hereinafter, described as "CFRTP") that use thermoplastic resins as matrix resins can be produced with high productivity because they can be processed by injection molding, and the short carbon fiber-reinforced thermoplastics have excellent mechanical characteristics, tribological characteristics, electric characteristics, dimensional stability and the like compared with conventional unreinforced thermoplastics or short glass fiber-reinforced thermoplastics. Therefore, attention has been paid to short carbon fiber-reinforced thermoplastics as a high performance engineering material, and the demand for them is rapidly increasing.

Conventionally, in order to obtain this CFRTP, a method of supplying chopped carbon fiber bundles obtained by cutting into 3 to 10 mm in length carbon fiber bundles bundled with a sizing agent, or milled fibers of carbon fibers that have been pulverized to 1 mm or less, to an extruder together with pellets or a powder of a thermoplastic; pelletizing by melt-kneading; and then molding with an injection molding machine or an extrusion molding machine; is employed.

For the production of chopped carbon fibers, carbon fibers having a number of filaments of about from 1,000 to 30,000 have been hitherto used as raw materials. However, in recent years, in order to cut down the production cost for chopped carbon fibers, measures have been taken to use carbon fiber bundles having a larger number of filaments compared to conventional carbon fiber bundles as raw materials for the production of chopped carbon fibers. That is, there is an increasing need to carry out the production of chopped carbon fibers using carbon fiber bundles having a large number of filaments and a high total fineness.

When a carbon fiber bundle having a large number of filaments and a high total fineness is produced, it is common to handle fiber bundles in a flattened form in order to smoothly carry out the removal of reaction heat at the time of baking.

As a result, in a case in which a chopped carbon fiber bundle is produced using a carbon fiber bundle having a large number of filaments and a high total fineness as a raw material, a chopped carbon fiber bundle having high flatness is produced, for the reason that when the flatness of such a carbon fiber bundle is made higher than that of conventional carbon fiber bundles, the sizing agent can easily penetrate into the interior of the carbon fiber bundle.

On the other hand, as the shape of the carbon fiber bundle becomes flat, there occurs a problem that a chopped carbon fiber bundle having low fluidity or low bundling properties is produced. Also, when the cross-sectional shape approaches a circular shape, the bulk density of the carbon fiber bundle is increased, and it becomes difficult for the sizing liquid to penetrate into the interior of the carbon fiber bundle. Therefore, cohesion of filaments becomes irregular in a bundle. Furthermore, since the shear force exerted in a compounding process is increased, the carbon fiber bundle is easily fibrillated, fiber balls are likely to be generated, and fluidity is decreased. Therefore, when the carbon fiber bundles are transported from a hopper to an extruder in the compounding process, problems such as clogging are likely to occur.

From the past, regarding the method for obtaining chopped carbon fiber bundles, a method of first immersing a carbon fiber bundle in a sizing liquid, subsequently cohering the filaments in the carbon fiber bundle in a drying step, and cutting the carbon fiber bundle with a cutter in a continuous or separate process, has been used commonly. On the other hand, regarding the method of chopping glass fibers, a method of applying a sizing agent to a bundle of melt-spun glass fibers, subsequently cutting the bundle in a wet state, and then drying the chopped bundle, is generally used. According to this method of chopping glass fibers, chopped fibers having high cohesion properties can be easily obtained with a small amount of deposit of the sizing agent, and examples of applying this method to carbon fibers include the inventions of Patent Document 1 and Patent Document 2. However, the number of filaments of a carbon fiber bundle to be chopped in the Patent Documents described above is about 12,000, and the inventions are not intended to treat a carbon fiber bundle having large numbers of filaments and high total fineness. In addition, regarding the chopped glass fibers described above, the number of filaments of a fiber bundle used in the process of applying a sizing agent to the glass fibers is about 4,000, and the process is not intended to treat thick fiber bundles.

As is widely known, various characteristics of CFRTP correlate to the length of the carbon fiber. When milled fibers, which are carbon fibers with a very short length, are used, since the length of the carbon fiber in the molded CFRTP is shortened, the various characteristics are inferior to those of the CFRTP for which chopped carbon fiber is used. Furthermore, although there are occasions in which long fiber pellets, whose length is the same as the cut length of fiber, are used in order to obtain a longer length of the carbon fiber in the CFRTP, difficulty in controlling the fiber orientation in the molded product make the material not very suitable for mass production of CFRTP to be inexpensive. Therefore, generally, chopped carbon fiber bundles are used.

On the other hand, Patent Document 3 discloses a chopped carbon fiber bundle which realizes large-scale packaging to cope with mass production, and can simultaneously satisfy stability in feeding from a hopper to an extruder and dispersibility, and a method for producing the chopped carbon fiber bundle. And it is suggested that the number of carbon fiber filaments that constitute the chopped carbon fiber bundle is of 30,000 to 120,000; the chopped carbon fiber bundle has a ratio (Dmax/Dmin) of the longest diameter (Dmax) and the shortest diameter (Dmin) of the cross-section of 1.0 to 1.8 and is bundled with a sizing agent of 1% to 10% by weight; and the ratio (L/Dmin) of the length of the chopped carbon fiber bundle (L) and the shortest diameter of the chopped carbon fiber bundle (Dmin) is 4 or less.

However, the chopped carbon fiber bundle described in Patent Document 3 have a carbon fiber bundle shape with low flatness, and are easy to cause failure in drying after a sizing agent is applied thereto, resulting in a problem requiring a decrease in the rate of production.

Furthermore, Patent Document 4 suggests a chopped carbon fiber bundle having excellent fluidity and cohesion properties, obtained using an inexpensive carbon fiber bundle of a large number of filaments as a raw material. The patent document suggests a collection of chopped carbon fibers with a sizing agent applied thereto, characterized in that the average weight per unit length in the fiber length direction of a short fiber bundle piece as a constituent unit of the collection is in the range 1.7 to 4 mg/mm, and the coefficient of variation in the distribution of weight per unit length in the fiber length direction is 30% to 60%; and a method for producing the chopped carbon fiber bundle.

However, it is described in Patent Document 4 that the cross-sectional shape of the chop is substantially rectangular, and the length of one side is 1.5 to 6 mm. If the length of one side is shorter than about 3 mm, even if the weight per unit length is 1.7 mg/mm, the cross-section has low flatness. Thus, there is also a problem that drying failure occurs during production, and there is a need to decrease the production rate.

As discussed above, in regard to chopped carbon fiber bundles, it has been difficult to increase fluidity of chopped carbon fiber bundles and to produce large quantities of chopped carbon fiber bundles with high productivity, without deteriorating dispersibility of the carbon fibers or the properties of a molded product.

CITATION LIST

Patent Document

Patent Document 1: JP 5-261729 A
Patent Document 2: JP 5-261730 A
Patent Document 3: JP 2011-208285 A
Patent Document 4: JP 11-81146 A

DISCLOSURE OF THE INVENTION

Problem to be Solved by the Invention

It is an object of the present invention to provide a chopped carbon fiber bundle which uses a carbon fiber bundle having a large number of filaments and high total fineness as a raw material, and exhibits satisfactory handleability and high productivity even if the amount of the deposit of the sizing agent is low, and a method for producing the chopped carbon fiber bundle.

Means for Solving Problem

The object of the present invention described above is achieved by the following various embodiments of the invention.

(1) A chopped carbon fiber bundle including a carbon fiber bundle having a total fineness of from 25,000 dtex to 45,000 dtex (inclusive); and a sizing agent in an amount of from 1% by mass to 5% by mass (inclusive) relative to the total mass of the chopped carbon fiber bundle, in which the length (L) of the chopped carbon fiber bundle along the fiber direction of the carbon fiber bundle is from 1 mm to 50 mm (inclusive), the ratio (Dmax/Dmin) of the longest diameter (Dmax) and the shortest diameter (Dmin) of a cross-section perpendicular to the fiber direction of the chopped carbon fiber bundle is from 6.0 to 18.0 (inclusive), and the orientation parameter of the single fibers present at the surface of the chopped carbon fiber bundle is 4.0 or less.

(2) The chopped carbon fiber bundle according to (1), wherein the ratio (L/Dmin) of the length (L) of the chopped carbon fiber bundle and the shortest diameter (Dmin) in a cross-section perpendicular to the fiber direction of the chopped carbon fiber bundle is from 5 to 30 (inclusive).

(3) The chopped carbon fiber bundle according to (1) or (2), wherein the bulk density of the chopped carbon fiber bundle is from 200 g/L to 650 g/L (inclusive).

(4) the chopped carbon fiber bundle according to any one of (1) to (3), wherein the sizing agent is a sizing agent including any one or more thermoplastic resins selected from a urethane-based resin, a nylon-based resin, a modified olefin-based resin, a modified epoxy-based resin, and a water-soluble nylon-based resin, as main components.

(5) A method for producing chopped carbon fiber bundles, the method including depositing a primary sizing agent having a viscosity at 30° C. of 3000 Pa·s or less in an amount of from 0.3% by weight to 1.5% by weight (inclusive) to a carbon fiber bundle having a total fineness of from 25,000 dtex to 45,000 dtex (inclusive); applying a sizing liquid containing a secondary sizing agent after adjusting the width of the carbon fiber bundle per unit fineness to the range of from 1/440 mm/tex to 1/100 mm/tex (inclusive); cutting the carbon fiber bundle; and then drying the sizing liquid.

(6) The method for producing a chopped carbon fiber bundle according to (5), wherein the primary sizing agent includes any one or more selected from an epoxy-based resin, a polyurethane-based resin, a nylon-based resin, a polyolefin-based resin, a polyester-based resin, and polyethylene glycol.

(7) The method for producing a chopped carbon fiber bundle according to (5), wherein the secondary sizing agent includes one or more thermoplastic resins selected from a urethane-based resin, a nylon-based resin, a modified olefin-based resin, a modified epoxy-based resin, and a water-soluble nylon-based resin.

(8) The method for producing a chopped carbon fiber bundle according to any one of (5) to (7), wherein the amount of the deposit of the sizing agents including the primary sizing agent and the secondary sizing agent to the carbon fiber bundle is 1% to 5% by mass (inclusive).

(9) A method for producing a carbon fiber-reinforced resin composition, the method including a step of incorporating the chopped carbon fiber bundle according to any one of (1) to (5) in an amount of carbon fiber of from 5 parts by mass to 150 parts by mass (inclusive) with 100 parts by mass of a matrix resin, and then mixing the matrix resin with the chopped carbon fibers.

(10) The method for producing a carbon fiber-reinforced resin composition according to (9), wherein the matrix resin includes any one or more selected from thermoplastic resins such as a polycarbonate resin, a nylon resin, a polyethylene terephthalate resin, a polybutylene terephthalate resin, an ABS resin, a polyoxymethylene resin, a polypropylene resin, a polyphenylene sulfide resin, a polyethersulfine resin, and a polyetherimide resin; and resins based on alloys thereof.

(11) The method for producing a pellet or a molded article using a carbon fiber-reinforced resin composition obtained by the production method according to (9) or (10).

Furthermore, according to an aspect from a different viewpoint of the present invention, the invention includes the following embodiments.

(12) A chopped carbon fiber bundle having a total fineness of from 25,000 dtex to 45,000 dtex (inclusive), a ratio (Dmax/Dmin) of the longest diameter (Dmax) and the shortest diameter (Dmin) of a cross-section of from 6.0 to 18.0, and an amount of the deposit of a sizing agent of from 1% by mass to 5% by mass (inclusive).

(13) The chopped carbon fiber bundle according to (12), wherein the bulk density is from 200 g/L to 300 g/L.

(14) A method for producing a chopped carbon fiber bundle, the method including applying a sizing liquid to a carbon fiber bundle having a total fineness of from 25,000 dtex to 45,000 dtex (inclusive) in a state without twists; cutting the carbon fiber bundle before the sizing liquid is dried; and drying the carbon fiber bundle.

Effect of the Invention

The chopped carbon fiber bundle of the present invention can exhibit excellent processability and handleability in a process for compounding with a matrix resin, and when the chopped carbon fiber bundle is used, a molded product having excellent mechanical characteristics is obtained. Furthermore, since the chopped carbon fiber bundle of the present invention has a flat shape, the productivity for the production of a chopped carbon fiber bundle is increased to a large extent.

MODE(S) FOR CARRYING OUT THE INVENTION

The chopped carbon fiber bundle related to an embodiment of the present invention is a chopped carbon fiber bundle having high fluidity, that is, stability in feeding, dispersibility, and high productivity, with a relatively small amount of a sizing agent. Regarding the present embodiment, the term chopped carbon fiber means carbon fiber made to have a length in the certain range described below by, for example, cutting. The chopped carbon fiber bundle of the present embodiment is obtained according to the following method.

Examples of the carbon fiber used in the present embodiment include various filament-like carbon fibers (including graphite fibers) of polyacrylonitrile (PAN)-based fibers, rayon-based fibers, and pitch-based fibers; and carbon fibers having metal coating films obtained by subjecting those carbon fibers to metal coating. These carbon fibers are produced by existing methods, and a carbon fiber bundle having a total fineness of 25,000 dtex to 45,000 dtex is suitable. Here, the total fineness denotes the sum of fineness of each fiber included in a fiber bundle, and is expressed in the unit "dtex", which is defined as the weight per length according to JIS L 0104. When the total fineness is 25,000 dtex or more, the production cost for carbon fibers can be reduced, so that the carbon fiber bundle is preferable as a reinforcing material for a short carbon fiber-reinforced thermoplastic composition material for which a low price is demanded, and the total fineness is more preferably 28,000 dtex or more. Also, when the total fineness is 45,000 dtex or less, it is preferable because the sizing liquid can easily penetrate into the interior at the time of application of the sizing agent, thus the bundle is made not easy to split at the time of cutting into the chopped carbon fiber bundle, and uniformity at the time of melt kneading is not easily deteriorated. The total fineness is more preferably 38,000 dtex or less, and even more preferably 35,000 dtex or less.

The sizing agent used in the present embodiment is a compound intended for changing the physical properties of a fiber bundle by being deposited (applied) to the fiber bundle to cohere the filaments, and examples thereof include a sizing agent formed from a resin. The resin used in a sizing agent may be any of a thermoplastic resin or a thermosetting resin, and examples that can be used include an epoxy resin, a urethane-modified epoxy resin, a polyester resin, a phenolic resin, a polyamide resin, a polyurethane resin, a polycarbonate resin, a polyetherimide resin, a polyamideimide resin, a polystyrpyridine resin, a polyimide resin, a bismaleimide resin, a polysulfone resin, a polyethersulfine resin, an epoxy-modified urethane resin, a polyvinyl alcohol resin, a polyvinylpyrrolidone resin, and simple substances or mixtures of modified resins of those resins. Particularly, from the viewpoint of having excellent flexibility and high cohesion properties, a sizing agent containing any one or more thermoplastic resins selected from a urethane-based resin, a nylon-based resin, a modified olefin-based resin, a modified epoxy-based resin, and a water-soluble nylon resin as main components, is preferred.

Furthermore, regarding the sizing agent, these thermoplastic resins can be used singly, or as mixtures of plural kinds, and a mixture obtained by incorporating an epoxy resin, an acrylic ester resin, a methacrylic ester resin, a silane coupling agent or the like can be used as the sizing agent. Among silane coupling agents, particularly an epoxysilane-based compound, an aminosilane-based compound, or a vinylsilane-based compound is desirable, and the epoxy group of the silane compound may be any of a glycidyl group or an alicyclic epoxy group.

According to the present embodiment, the amount of deposit of the sizing agent to the chopped carbon fiber bundle needs to be 1% to 5% by mass relative to the total mass of the chopped carbon fiber bundle.

When the amount of deposit of the sizing agent is 1% by mass or more, satisfactory cohesion properties of the chopped carbon fiber bundle are obtained, and feeding to an extruder or the like is likely to be stabilized. When the amount of adhesion is 5% by weight or less, satisfactory dispersibility is obtained, and the mechanical characteristics are not easily deteriorated. Also, the amount of decomposition gas generated by thermal decomposition can also be easily suppressed, and it is easier to cut the fibers at the time of cutting during the production of the chopped carbon fiber bundle, which is preferable. From these points of view, the total amount of deposit of the sizing agent is more preferably 2% by mass or more, and more preferably 4% by mass or less.

It is necessary for the chopped carbon fiber bundle of the present embodiment that the ratio (Dmax/Dmin) of the longest diameter (Dmax) and the shortest diameter (Dmin) of a cross-section perpendicular to the fiber direction, be 6.0 to 18.0. When the ratio is 6.0 or more, the sizing agent can be easily deposited uniformly, and the feeding of the chopped carbon fiber bundle at the time of compound production is stabilized. Furthermore, when the ratio Dmax/Dmin is 18.0 or less, the chopped carbon fiber bundle does not easily split along the fiber direction, and the feeding is easily stabilized. From these points of view, the ratio Dmax/Dmin is more preferably from 8.0 to 15.0, and even more preferably from 9.0 to 12.0.

The chopped carbon fiber bundle of the present embodiment is further characterized in that the orientation parameter of the single fibers present at the surface of the chopped carbon fiber bundle is 4.0 or less. The orientation parameter is a value defined by the formula described below, and a smaller value of the orientation parameter means that the orientation of the single fibers is better aligned. In addition to the cross-section shape described above, when the orientation parameter is adjusted to 4.0 or less, even if the amount of deposit of the sizing agent is small, satisfactory cohesion properties between the single fibers present at the surface of the chopped carbon fiber bundle are obtained. Furthermore, as the interaction between the individual chopped carbon fiber bundles is decreased, in the production process of compound by mixing chopped carbon fiber bundles with a matrix resin, feeding of the chopped carbon fiber bundles is stabilized. The orientation parameter is more desirably 3.0 or less.

Meanwhile, in regard to the orientation parameter according to the present embodiment, the frequency distribution vs. the orientation angles (divided into every one degree) of the single fibers weighed with length, is fitted to the following Lorentz function, and the full width at half maximum thus obtained is defined as the orientation parameter.

$$f(x)=h/(1+[(x-u)]^2/w^2)+b$$

wherein x: variable, h: height of the peak, u: position of the peak, w: full width at half maximum of the peak, and b: height of the baseline)

Furthermore, the ratio (L/Dmin) of the length (L) of the chopped carbon fiber bundle of the present embodiment and the shortest diameter (Dmin) of the chopped carbon fiber bundle is preferably from 5 to 30. When this ratio is 5 or more, it is easier to suppress deterioration of the properties of a molded product. When the ratio is 30 or less, it is preferable because there are fewer contact points between the chopped carbon fiber bundles, and fluidity is not decreased. From these points of view, the ratio L/Dmin is more preferably from 8 to 20, and even more preferably from 10 to 15.

The bulk density of the chopped carbon fiber bundle represents the weight of carbon fiber per a certain volume (1 L), and the bulk density is desirably from 200 g/L to 650 g/L. In general, if the bulk density is less than 200 g/L, the friction resistance exerted to a one chop with other chops that are in contact at the surface of the one chop becomes larger than the gravity exerted to the one chop, and a part that does not move from the hopper is generated. Furthermore, it is generally difficult to produce chopped carbon fiber bundles having a bulk density of 650 g/L or more. Meanwhile, the bulk density may be from 200 g/L to 300 g/L.

The length (L) of the chopped carbon fiber bundle of the present embodiment may vary depending on the molding method to be used; however, the length is desirably in the range of from 1 mm to 50 mm, preferably from 3 mm to 40 mm, and more preferably from 5 mm to 30 mm. When the length is 1 mm or more, since the chopped carbon fiber bundle has excellent handleability, productivity for the process of producing a compound from the chopped carbon fiber bundles and a matrix resin is not decreased, which is preferable. Furthermore, when the length is 50 mm or less, it is preferable because there is no decrease in the processability when molding is carried out using a compound obtained from the chopped carbon fiber bundles and a matrix resin. Meanwhile, adjusting the length of a chopped carbon fiber bundle to one of the ranges described above means each of the chopped carbon fiber bundle in one assembly substantially has a length in the range described above. Even more specifically, for example, it is implied that 95.0% or more of the total amount of the chopped carbon fiber bundles has a length in the range described above.

The method for producing a chopped carbon fiber bundle of the present embodiment is not particularly limited; however, a method of producing a chopped carbon fiber bundle by depositing a sizing liquid including a sizing agent to the carbon fiber bundle, subsequently cutting the carbon fiber bundle in a wet state with the sizing liquid to a predetermined length, and drying the carbon fiber bundle, is preferred from the viewpoint of processability. There are no particular limitations on the method of depositing the sizing agent at the time of obtaining a chopped carbon fiber bundle; however, a touch roll system of applying a sizing liquid on the surface of a roll that is partially immersed in the sizing liquid, and then depositing the liquid on the surface of the roll to a carbon fiber bundle by contacting; an immersion system of applying a sizing liquid to a carbon fiber bundle by immersion, and optionally controlling the amount of deposit of the sizing liquid by the squeezing force with a set of nip rollers; and the like can be employed. Among these, it is optimal to make a carbon fiber bundle to have contact with each one of plural touch rolls, from the viewpoint of controlling the amount of deposit and the width of the carbon fiber bundle.

The concentration of the sizing agent in the sizing liquid is preferably 0.5% to 30% by mass. The solvent of the sizing liquid may vary depending on the kind of the sizing agent, and the solvent is appropriately selected from water; alcohols such as ethyl alcohol and methyl alcohol; ketones such as acetone and methyl ethyl ketone; xylene, dichloromethane, N-methylpyrrolidone, dimethylformamide, tetrahydrofuran, toluene, and mixed systems thereof.

Furthermore, in regard to the production method described above, it is preferable to deposit a primary sizing agent having a viscosity at 30° C. of 3000 Pa·s or less, and more preferably 2500 Pa·s or less, in an amount of from 0.3% by weight to 1.5% by weight to the carbon fiber bundle before depositing the sizing liquid, and then to deposit the sizing liquid (sizing liquid including a secondary sizing liquid; hereinafter, appropriately simplified as "secondary sizing liquid") to the carbon fiber bundle. When the viscosity and the amount of deposit of the primary sizing agent are in this range, the width of the carbon fiber bundle that will be described below can be controlled while fluffing in the process of depositing the secondary sizing liquid is suppressed.

The component of the primary sizing agent is not particularly limited; however, an epoxy-based resin, a polyurethane-based resin, a nylon-based resin, a polyolefin-based resin, a polyester-based resin, polyethylene glycol, or the like can be used. These may be used singly or in combination of two or more kinds. In some cases, an emulsifying agent, a surfactant or the like can be included.

Furthermore, in regard to the production method described above, it is preferable to adjust the width of the carbon fiber bundle per fineness to the range of from 1/440 mm/tex to 1/100 mm/tex before the secondary sizing liquid is deposited, and then to apply the second sizing liquid. When the width of the carbon fiber bundle is 1/440 mm/tex or more, the cohesion properties can be easily enhanced by controlling the liquid content. Furthermore, when the width is 1/100 mm/tex or less, the time for the secondary sizing liquid to sufficiently penetrate into the interior of the fiber bundle can be shortened. Therefore, unevenness in impregnation does not occur in a continuous process, and the cohesion properties are enhanced. A more desirable range is from 1/370 mm/tex to 1/150 mm/tex. When the width is from 1/370 mm/tex to 1/150 mm/tex, fluffing at the time of adjusting the carbon fiber bundle can be prevented while penetration of the secondary sizing liquid is accelerated, and a chopped carbon fiber bundle having a suitable orientation of single fibers can be produced with high productivity.

The carbon fiber bundle before the secondary sizing liquid is deposited may be a fiber bundle produced by connecting fiber bundles taken out from plural packages. The method for connecting the ending part of a fiber bundle in a certain carbon fiber package with the beginning part of the fiber bundle in the subsequent package is not particularly limited; however, connecting by air interlacing. This is because the processability for producing a chopped carbon fiber bundle is markedly deteriorated if connection is made by directly tying the fibers or by a similar way. The connection between two or more fiber bundles by air interlacing is preferable because satisfactory processability is obtained, and the quality of the product is less affected by the connection.

Furthermore, the cutting system to cut a carbon fiber bundle into a chopped carbon fiber bundle is not particularly limited; however, it is preferable to produce the chopped carbon fiber bundle by cutting by a rotary cutter system. When the carbon fiber bundle is cut with a rotary cutter, if the thickness of the carbon fiber bundle is too thick, cutting failure may occur, the fiber may be wound around the rotor causing operation failure, or defects may occur in the chopped fiber form. Therefore, a smaller thickness of the carbon fiber bundle is preferred.

Drying of the chopped carbon fiber bundle that has been cut is not particularly limited; however, drying is usually carried out by a hot air method. In this case, in order to increase the moisture evaporation efficiency, and in order to prevent adhesion between the chopped carbon fiber bundles, a system of transporting the chopped carbon fiber bundles while vibrating the chopped carbon fiber bundles is preferably used. In this case, in order to increase the drying efficiency, an auxiliary means such as infrared irradiation can be used in combination. If the conditions for vibration at the time of drying are too severe, bundle breakage of the chopped carbon fiber bundle thus obtained easily occurs, and the proportion of chopped carbon fiber bundles having a ratio of bundle width/thickness of less than 2 increases. Also, if the conditions for vibration are too weak, pseudo-adhesion between chopped carbon fiber bundles occurs.

The method for producing a carbon fiber-reinforced resin composition of the present embodiment relates to a method for producing a carbon fiber-reinforced resin composition, the method including incorporating 100 parts by mass of a matrix resin with the chopped carbon fiber bundles described above in an amount of carbon fibers of from 5 parts by mass to 150 parts by mass, and preferably from 15 parts by mass to 40 parts by mass, and then mixing the matrix resin with the chopped carbon fibers. When the content of the carbon fibers in the form of chopped carbon fiber bundles is in this range, the electrical conductivity and mechanical properties are markedly enhanced by the addition of carbon fibers. Alternately, the chopped carbon fiber bundles may be incorporated in an amount of carbon fibers of 5% to 60% by mass, and preferably 10% to 30% by mass, relative to the total mass of the matrix resin.

Regarding the matrix resin according to the method for producing a carbon fiber-reinforced resin composition of the present embodiment, a known thermoplastic resin or thermosetting resin or the like is used. Examples of the thermoplastic resin include a polycarbonate resin, a nylon resin, a polyester resin, an ABS resin, a polystyrene-based resin, a polyphenylene ether-based resin, a polyoxyethylene resin, a polyolefin resin, a polyetherimide resin, other industrially useful engineering resins, and polymer alloy resins thereof. Examples of the thermosetting resin include an unsaturated polyester resin, a vinyl ester resin, and a phenolic resin.

The matrix resin that is particularly preferably used in the present embodiment is one or more selected from thermoplastic resins including a polycarbonate resin, a nylon resin, a polyethylene terephthalate resin, a polybutylene terephthalate resin, an ABS resin, a polyoxymethylene resin, a polypropylene resin, a polyphenylene sulfide resin, a polyethersulfine resin, and a polyetherimide resin; and resins of alloy systems thereof.

The carbon fiber-reinforced resin composition of the present embodiment may include additives such as a filler, an elastomer (rubber), carbon black, a particulate material of a metal oxide or a ceramic, and a flame retardant. In the case of incorporating an additive, the amount of additives is 43 parts by mass or less, and preferably 17 parts by mass or less, relative to 100 parts by mass of the carbon fiber-reinforced resin composition of the present embodiment.

The carbon fiber-reinforced resin composition described above is prepared by mixing the chopped carbon fiber bundle described above, a matrix resin, and optionally additives using a known method.

The present embodiment relates to a method for producing a pellet or a molded article using a carbon fiber-reinforced resin composition obtained by the production methods described above. There are no particular limitations on the method for producing a pellet or a molded article, and any known method can be used. In general, in a case in which the matrix resin is a thermoplastic resin, an injection molding method is employed, and in a case in which the matrix resin is a thermosetting resin, a press molding method, or a high pressure press molding method generally used for a sheet molding compound or a bulk molding compound is employed.

It is important to control the tension and shape of the fiber bundles, particularly the width of the fiber bundles, since the fiber bundles are impregnated with the sizing liquid until the fiber bundles are cut, because the fluidity and cohesion properties of the chopped carbon fibers are affected. Therefore, the fiber bundles may be cut after the packing density is adjusted to a target packing density in the range of 5,000 to 20,000 dtex/mm using various guides, grooved rollers and the like arranged. Here, the packing density is a value obtained by dividing the total fineness (dtex) of a fiber bundle by the width of the fiber bundle (mm).

According to the present embodiment, the sizing agent may be applied after the packing density of the carbon fibers in a carbon fiber bundle is adjusted to the range of 1,000 to 4,000 dtex/mm. When the packing density of the carbon fibers is 1,000 dtex/mm or more, the cohesion properties can be easily enhanced by controlling the liquid content. Furthermore, when the packing density is 4,000 dtex/mm or less, since the time required for the sizing liquid to sufficiently penetrate into the interior of the fiber bundle can be shortened, unevenness in impregnation does not easily occur even in a continuous process, and the cohesion properties are enhanced.

According to the present embodiment, in a case in which the ending part of a fiber bundle is connected to the beginning part of the fiber bundle in the subsequent carbon fiber package, it is preferable that the fiber bundles be connected by interlacing using a fluid. There are no particular limitations as long as a fluid is used; however, air interlacing is preferable. This is because the processability of producing a chopped carbon fiber bundle is markedly deteriorated if the fiber bundles are directly tied with one another or connected likewise. When some of the fiber bundles within a carbon fiber package have connections connecting two or more fiber bundles made by air interlacing, it is preferable because satisfactory processability is obtained, while the unfavorable influence of the connections on the quality of the manufactured products is smaller.

EXAMPLES

Hereinafter, embodiments of the present invention will be described in more detail by way of Examples, but the present invention is not intended to be limited by these Examples.

(Measurement of Amount of Deposit of Sizing Agent)

About 2 g of chopped carbon fiber bundles were collected, and the weight (W1) was measured. Subsequently, the carbon fiber bundles were left to stand for 15 minutes in a muffle furnace (manufactured by Yamato Scientific Co., Ltd., product name: FP410) set at a temperature of 450° C. in a nitrogen gas stream at 40 liters/min, and thus the sizing agent was completely thermally decomposed. Then, the carbon fiber bundles were transferred to a vessel in a dry nitrogen gas stream at 20 liters/min and cooled for 15 minutes, and then the carbon fiber bundles were weighed (W2). The amount of deposit of the sizing agent was determined by the following formula:

Amount of adhesion of sizing agent (wt %)=$(W1-W2)/W1 \times 100$    (i)

(Measurement of Cross-Sectional Shape of Chopped Carbon Fiber Bundle)

Fifty fiber bundles were randomly selected from the chopped carbon fiber bundles thus obtained, and the lengths of the chopped carbon fiber bundles and the longest diameter of their cross-sections were measured using vernier calipers, while the shortest diameter of the cross-sections were measured using a flat face micrometer. The each average value of the measured values of the 50 bundles were calculated, and the length of the chopped carbon fiber bundle was designated as L, the longest diameter of the cross-section as Dmax, and the shortest diameter of the cross-section as Dmin.

(Measurement of Bulk Density)

300 g of chopped carbon fiber bundles were filled in a 2-L graduated cylinder, and the graduated cylinder was subjected to light impacts. The volume after there was no more change in the volume of the chopped carbon fiber bundles was measured, and the bulk density was calculated using this volume and the weight of the chopped carbon fiber bundles.

(Measurement of Orientation Parameter)

The orientation parameter (degree of orientation) of the single fibers present at the surface of a chopped carbon fiber bundle was analyzed by the following method.

A chopped carbon fiber bundle thus obtained was observed using an optical microscope (manufactured by Keyence Corp., DIGITAL MICROSCOPE VHX-500F) under reflected light at a magnification ratio of 200 times. For the observation, images (1600×1200 pixels) in which all the carbon fiber filaments were in focus in the image were taken using a high-resolution depth resolved imaging function. Meanwhile, when observation is made under reflected light, a carbon fiber filament appears white compared with a part without a filament.

The images thus taken were analyzed by the following procedure using an image analysis software (manufactured by Mitani Corp., two-dimensional image analysis software, WinROOF).

The images were binarized by defining pixels in which the luminance after gray scale conversion is brighter than the threshold value B, to be white, and pixels darker than the threshold value B to be black. The threshold value B of luminance was defined such that the luminance values of all the pixels included in an image were plotted into a histogram (frequency distribution), and then the sum of the frequencies of the cases of having a luminance lower than or equal to B and the sum of the number, and the sum of the frequencies of the cases of having a luminance higher than or equal to B were adjusted to have the same value.

Furthermore, white lines (representing carbon fiber filaments) in a binarized image were assumed to be straight lines by a needle shape separation function of the image analysis software, and the coordinates of the starting points and the end points, (Xs, Ys) and (Xe, Ye), of all the white lines in the image were defined.

The angle θ in degrees and the length L of each line segment were calculated from the coordinates of the starting points and the end points, (Xs, Ys) and (Xe, Ye), of the white lines obtained by the image analysis, using the following expression:

$\theta = \mathrm{ArcTan}((Ys-Ye)/(Xs-Xe))+90$ $L = \sqrt{([(Xs-Xe)]^2+[(Ys-Ye)]^2)}$ For all of the white lines in the image, the angle θ and the length L of the line segments were calculated, and a frequency distribution at the angle θ ranging from 0° to 180° was produced by adding the lengths of the line segments included in the frequency for each degree.

Next, for the frequency distribution thus obtained, the angle with the highest frequency was defined as θmax, and θnew was newly defined as follows for the value 0 of the original frequency axis of the frequency distribution.

θnew=θ+(90−θmax), provided that 0≤θ+(90−θmax)≤180

θnew=θ+(90−θmax)−180, provided that θ+(90−θmax)>180

θnew=θ+(90−θmax)+180, provided that θ+(90−θmax)<180

In a frequency distribution which uses θnew on the horizontal axis, the angle with the highest frequency is 90°.

Next, a frequency distribution which used θnew on the horizontal axis was fitted to the following Lorentz function:

$f(x) = h/(1+[(x-u)]^2/w^2)+b$ (wherein x: variable, h: height of the peak, u: position of the peak, w: full width at half maximum of the peak, and b: height of the baseline)

using the least squares method, and the parameter of the full width at half maximum thus obtained was defined as the degree of orientation.

For one chopped carbon fiber bundle, three samples were collected, and microscopic photographs were taken at three sites for each sample. The average value of these values was defined as the orientation parameter (degree of orientation) of a single fiber present at the surface of the chopped carbon fiber bundle.

(Evaluation of Feed Properties)

1 kg of the chopped carbon fiber bundles thus obtained were fed into a weight type screw feeder with a screw unit having a diameter of 30 mm, and the chopped carbon fiber bundles were conveyed at a rate of 15 kg per hour. When the entirety of 1 kg could be conveyed, the sample was considered to have satisfactory feed properties, when the chopped carbon fiber bundles caused bridging in the screw unit during conveyance and caused conveyance failure, the sample was considered to be unfeedable.

Example 1

A carbon fiber bundle TRH50 60M (trade name, manufactured by Mitsubishi Rayon Co., Ltd., total fineness 33,000 dtex) in which 1.2% by mass of a low-viscosity epoxy A as a primary sizing agent was deposited, was used.

The carbon fiber bundles were alternately passed through the scraping with plural fiber bundle-opening bars and a tow width regulating bar, and thereby the width of the carbon fibers per fineness was adjusted to 1/440 mm/tex. Thereafter, an aqueous urethane resin E as a secondary sizing agent was deposited to the carbon fiber bundles using an aqueous solution prepared to have a solid content concentration of the aqueous urethane resin E of 6.0% by weight (secondary sizing liquid).

A portion of a touch roll was immersed in the secondary sizing liquid tank, and the secondary sizing liquid was applied on the roll surface by rotating the touch roll. Subsequently, the carbon fiber bundles were brought into continuous contact with the roll surface, and thereby the secondary sizing liquid was deposited to the carbon fiber bundles (touch roll system). At this time, the secondary sizing liquid was applied on both of the front surface and the back surface of the carbon fiber bundles using two touch rolls.

Subsequently, the carbon fiber bundles were cut using a rotary cutter having an interval of cutting blades of 6 mm, before the secondary sizing liquid applied on the carbon fiber bundles dried up, that is, while the carbon fiber bundles were in a wet state. Thereafter, the cut carbon fiber bundles were dried by continuously introducing the carbon fiber bundles into a floor vibration type hot air drying furnace (drying temperature 200° C.), and thus chopped carbon fiber bundles were obtained.

The amount of deposite of the sizing agent to the chopped carbon fiber bundles, the shape of the chopped carbon fiber bundles, the bulk density, and the orientation parameter were analyzed using the chopped carbon fiber bundles thus obtained. Furthermore, an evaluation of the feed properties of the same chopped carbon fiber bundles was carried out. The results are presented in Tables 1 and 2. Meanwhile, the details of the compositions of the various resins used as the sizing agent are presented in Tables 3 and 4. The same applies to the following Example 2 and other Examples.

Example 2

Chopped carbon fiber bundles were obtained in the same manner as in Example 1, except that a water-soluble nylon resin F was used instead of the aqueous urethane resin E as the secondary sizing agent. The chopped carbon fiber bundles thus obtained were subjected to the same analysis as that performed in Example 1. In the same manner as in Example 1, the amount of deposit of the sizing agent to the chopped carbon fiber bundles, the cross-sectional shape, the bulk density, and the orientation parameter were analyzed. Furthermore, an evaluation of the feed properties of the same chopped carbon fiber bundles was carried out. The results are presented in Tables 1 and 2.

Comparative Example 1

The carbon fiber bundles used in Example 1 (TRH50 60M, low viscosity epoxy A is adhered in an amount of 1.2% by mass) were subjected to twisting at a rate of 10 turns per meter. Subsequently, the carbon fiber bundles were immersed in an aqueous solution prepared by using the aqueous urethane resin E at a solid content concentration of 6.0% by weight (secondary sizing liquid), and the carbon fiber bundles were passed between nip rolls, and then were dried by bringing the carbon fiber bundles into contact with a heating roll (surface temperature 140° C.) for 10 seconds. Thus, carbon fiber bundles were obtained. The carbon fiber bundles thus obtained were cut using a rotary cutter having an interval of cutting blades of 6 mm, and thus chopped carbon fiber bundles were obtained. The chopped carbon fiber bundles thus obtained were subjected to the same analysis as that performed in Example 1.

Example 3

Chopped carbon fiber bundles were obtained by the same method as that used in Example 2, except that the width of the carbon fibers per fineness before the secondary sizing liquid was applied to the carbon fiber bundles was adjusted to 1/230 mm/tex. The chopped carbon fiber bundles thus obtained were subjected to the same analysis as that performed in Example 1. The results are presented in Tables 1 and 2.

Example 4

Chopped carbon fiber bundles were obtained in the same manner as in Example 3, except that a carbon fiber bundle TRW50 50L (trade name, manufactured by Mitsubishi Rayon Co., Ltd, total fiber fineness 37,000 dtex) having a low viscosity epoxy A as a primary sizing agent adhered thereto in an amount of 1.2% by mass, was used, and the aqueous urethane resin E was used as the secondary sizing agent. The chopped carbon fiber bundles thus obtained were subjected to the same analysis as that performed in Example 1. The results are presented in Tables 1 and 2.

Comparative Example 2

Cut carbon fiber bundles were obtained were obtained by the same method as that used in Example 1, except that the width of the carbon fibers per fineness before the secondary sizing liquid was applied to the carbon fiber bundles was adjusted to ⅕₀ mm/tex. Subsequently, the cut carbon fiber bundles were dried by introducing the carbon fiber bundles continuously to a floor vibration type hot air drying furnace (drying temperature 200° C.), and the cut carbon fiber bundles exhibited longitudinal cracks and fluffing. Thus, intended chopped carbon fiber bundles could not be obtained.

Examples 5 to 8 and Comparative Example 3

Chopped carbon fiber bundles were obtained by the same method as that used in Example 1, except that the width of the carbon fibers per fineness before the secondary sizing liquid was applied to the carbon fiber bundles was adjusted as indicated in Table 1. The chopped carbon fiber bundles thus obtained were subjected to the same analysis as that performed in Example 1. The results are presented in Tables 1 and 2.

Comparative Example 4

The carbon fiber bundles used in Example 1 (TRH50 60M, low viscosity epoxy A is adhered in an amount of 1.2% by mass) were used. The width of the carbon fibers per fineness before the secondary sizing liquid was applied to the carbon fiber bundles was adjusted to ¹⁄₁₃₀ mm/tex, and then the aqueous urethane resin E as a secondary sizing agent was deposited to the carbon fiber bundles by the same method as that used in Example 1, using an aqueous solution prepared with the aqueous urethane resin E to obtain a solid content concentration of 6.0% by weight (secondary sizing liquid). Subsequently, the carbon fiber bundles that were in a wet state were dried in a hot air drying furnace for 2 minutes at 200° C., and then the carbon fiber bundles were cut with a rotary cutter having an interval of cutting blades of 6 mm. Thus, chopped carbon fiber bundles were obtained. The chopped carbon fiber bundles thus obtained were subjected to the same analysis as that performed in Example 1. The results are presented in Tables 1 and 2.

Comparative Example 5

Chopped carbon fiber bundles were obtained in the same manner as in Comparative Example 4, except that the width of the carbon fibers per fineness before the secondary sizing liquid was applied to the carbon fiber bundles was adjusted to ¹⁄₄₁₀ mm/tex. The chopped carbon fiber bundles thus obtained were subjected to the same analysis as that performed in Example 1.

Comparative Examples 6 and 7

Chopped carbon fiber bundles were obtained in the same manner as in Comparative Example 1, except that the width of the carbon fibers per fineness before the secondary sizing liquid was applied to the carbon fiber bundles was adjusted as indicated in Table 1. The chopped carbon fiber bundles thus obtained were subjected to the same analysis as that performed in Example 1. The results are presented in Tables 1 and 2.

Comparative Example 8

Carbon fiber bundles TRH50 60M (trade name, manufactured by Mitsubishi Rayon Co., Ltd., total fiber fineness 33,000 dtex) in which a medium-viscosity urethane B as a primary sizing agent was deposited in an amount of 1.2% by mass, were cut with a rotary cutter having an interval of cutting blades of 6 mm. However, fluffing occurred to a large extent at the time of cutting, and chopped carbon fiber bundles could not be produced.

Example 9

Chopped carbon fiber bundles were obtained by the same method as that used in Example 1, except that the same carbon fiber bundle used in Comparative Example 8 (TRH50 60M, medium-viscosity urethane B was adhered in an amount of 1.2% by mass) was used, and the width of the carbon fibers per fineness before the secondary sizing liquid was applied to the carbon fiber bundles was adjusted to ¹⁄₁₀₀ mm/tex. The chopped carbon fiber bundles thus obtained were subjected to the same analysis as that performed in Example 1. The results are presented in Tables 1 and 2.

Examples 10 and 11

Chopped carbon fiber bundles were obtained by the same method as that used in Example 9, except that the width of the carbon fibers per fineness before the secondary sizing liquid was applied to the carbon fiber bundles, and the amount of deposit of the secondary sizing agent were adjusted as indicated in Table 1. The chopped carbon fiber bundles thus obtained were subjected to the same analysis as that performed in Example 1. The results are presented in Tables 1 and 2.

Comparative Example 9

Carbon fiber bundles TRH50 60M (trade name, manufactured by Mitsubishi Rayon Co., Ltd., total fiber fineness 33,000 dtex) in which a high viscosity urethane C as a primary sizing agent was deposited in an amount of 1.2% by mass, were alternately passed through the scraping with plural fiber bundle opening bars and a tow width regulating bar in an attempt to adjust the width of the carbon fibers per fineness to ¹⁄₄₄₀ mm/tex. However, fluffing occurred due to the fiber bundle opening bars and the tow width regulating bar, and chopped carbon fiber bundles could not be produced.

Comparative Example 10

Carbon fiber bundles TRH50 60M (trade name, manufactured by Mitsubishi Rayon Co., Ltd., total fiber fineness 33,000 dtex) in which a high viscosity epoxy D as a primary sizing agent was deposited in an amount of 1.2% by mass, were alternately passed through the scraping with plural fiber bundle opening bars and a tow width regulating bar in an attempt to adjust the width of the carbon fibers per fineness to ¹⁄₄₄₀ mm/tex. However, fluffing occurred due to the fiber bundle opening bars and the tow width regulating bar, and chopped carbon fiber bundles could not be produced.

Comparative Example 11

Chopped carbon fiber bundles were obtained by the same method as that used in Example 1, except that the carbon fiber bundles used in Comparative Example 10 (TRH50 60M, high viscosity epoxy D was deposited in an amount of 1.2% by mass) were used, and the width of the carbon fibers per fineness before the secondary sizing liquid was applied to the carbon fiber bundles was adjusted to ¹⁄₆₀₀ mm/tex. The chopped carbon fiber bundles thus obtained were subjected to the same analysis as that performed in Example 1. The results are presented in Tables 1 and 2.

Example 12

Chopped carbon fiber bundles were obtained in the same manner as in Example 7, except that an aqueous polyolefin resin G was used as the secondary sizing liquid. The chopped carbon fiber bundles thus obtained were subjected to the same analysis as that performed in Example 1. The results are presented in Tables 1 and 2.

Example 13

Chopped carbon fiber bundles were obtained in the same manner as in Example 7, except that an aqueous epoxy resin H was used as the secondary sizing liquid. The chopped carbon fiber bundles thus obtained were subjected to the same analysis as that performed in Example 1. The results are presented in Tables 1 and 2.

The chopped carbon fiber bundles of Examples had cross-sections having an appropriate flat shape, and since the single fibers that constituted the chopped carbon fiber bundles were highly oriented, even if the amount of deposit of the sizing agent was relatively low, the sizing agent was uniformly applied. Thus, chopped carbon fiber bundles having satisfactory product quality were obtained with high productivity.

On the contrary, the chopped carbon fiber bundles of Comparative Example 1, Comparative Example 5, and Comparative Example 11 had cross-sections with low flatness, and since the single fibers were not oriented, the chopped carbon fiber bundles had poor handleability at the time of compound production.

The chopped carbon fiber bundles of Comparative Example 3 and Comparative Example 7 had cross-sections with an appropriate flat shape; however, since the single fibers that constituted the chopped carbon fiber bundles were not oriented, fluffing easily occurred when the chopped carbon fiber bundles were rubbed with each other, and handleability was deteriorated.

In the chopped carbon fiber bundles of Comparative Example 4 and Comparative Example 6, the single fibers that constituted the carbon fiber bundles were oriented; however, since the flatness of the cross-sections was low, or the flatness was excessive, the carbon fiber bundles were easily scattered and had poor handleability.

The chopped carbon fiber bundles of Comparative Example 8 had cross-sections with an appropriate flat shape, and the single fibers that constituted the chopped carbon fiber bundles were oriented. However, since the amount of deposite of the sizing agent was too small, the carbon fiber bundles were easily scattered and had poor handleability.

Furthermore, Comparative Example 2, Comparative Example 9, and Comparative Example 10 exhibit that if the viscosity of the primary sizing agent and the width of the carbon fiber bundles at the time of applying the sizing liquid are not adequate, chopped carbon fiber bundles cannot be produced stably.

From the results described above, it was found that even if the amount of deposit of the sizing agent is relatively low, the sizing agent is uniformly applied by the present invention, and chopped carbon fiber bundles exhibiting satisfactory handleability and high productivity are obtained.

TABLE 1

| | Raw material | Primary sizing agent | | | Secondary sizing agent | | Conditions |
| | | | | Width of carbon fiber bundle per fineness | | Amount of deposit of primary and | for drying |
| | carbon fiber Product kind | Kind | Viscosity (30° C., Pa × s) | Amount of deposit (mass %) | before application of secondary sizing agent (mm/tex) | Secondary sizing agent | secondary sizing agents (mass %) | and cutting (Order) |
| --- | --- | --- | --- | --- | --- | --- | --- | --- |
| Example 1 | TRH50 60M | Low viscosity epoxy A | 50 | 1.2 | 1/440 | Aqueous urethane resin E | 3.2 | Cutting->hot air drying |
| Example 2 | TRH50 60M | Low viscosity epoxy A | 50 | 1.2 | 1/440 | Water-soluble nylon resin F | 3.6 | Cutting->hot air drying |
| Comparative Example 1 | TRH50 60M | Low viscosity epoxy A | 50 | 1.2 | 1/440 | Aqueous urethane resin E | 2.6 | Roll drying->cutting |
| Example 3 | TRH50 60M | Low viscosity epoxy A | 50 | 1.2 | 1/230 | Water-soluble nylon resin F | 2.5 | Cutting->hot air drying |
| Example 4 | TRW50 50L | Low viscosity epoxy A | 50 | 1.2 | 1/230 | Aqueous urethane resin E | 2.5 | Cutting->hot air drying |
| Comparative Example 2 | TRH50 60M | Low viscosity epoxy A | 50 | 1.2 | 1/50 | Aqueous urethane resin E | 2.5 | Cutting->hot air drying |
| Example 5 | TRH50 60M | Low viscosity epoxy A | 50 | 1.2 | 1/100 | Aqueous urethane resin E | 2.5 | Cutting->hot air drying |

TABLE 1-continued

| | Raw material carbon fiber Product kind | Primary sizing agent | | | Secondary sizing agent | | | Conditions for drying and cutting (Order) |
|---|---|---|---|---|---|---|---|---|
| | | Kind | Viscosity (30° C., Pa × s) | Amount of deposit (mass %) | Width of carbon fiber bundle per fineness before application of secondary sizing agent (mm/tex) | Secondary sizing agent | Amount of deposit of primary and secondary sizing agents (mass %) | |
| Example 6 | TRH50 60M | Low viscosity epoxy A | 50 | 1.2 | 1/130 | Aqueous urethane resin E | 2.5 | Cutting->hot air drying |
| Example 7 | TRH50 60M | Low viscosity epoxy A | 50 | 1.2 | 1/230 | Aqueous urethane resin E | 2.5 | Cutting->hot air drying |
| Example 8 | TRH50 60M | Low viscosity epoxy A | 50 | 1.2 | 1/400 | Aqueous urethane resin E | 2.5 | Cutting->hot air drying |
| Comparative Example 3 | TRH50 60M | Low viscosity epoxy A | 50 | 1.2 | 1/600 | Aqueous urethane resin E | 2.5 | Cutting->hot air drying |
| Comparative Example 4 | TRH50 60M | Low viscosity epoxy A | 50 | 1.2 | 1/130 | Aqueous urethane resin E | 2.5 | Hot air drying->cutting |
| Comparative Example 5 | TRH50 60M | Low viscosity epoxy A | 50 | 1.2 | 1/400 | Aqueous urethane resin E | 2.5 | Hot air drying->cutting |
| Comparative Example 6 | TRH50 60M | Low viscosity epoxy A | 50 | 1.2 | 1/130 | Aqueous urethane resin E | 2.5 | Roll drying->cutting |
| Comparative Example 7 | TRH50 60M | Low viscosity epoxy A | 50 | 1.2 | 1/400 | Aqueous urethane resin E | 2.5 | Roll drying->cutting |
| Comparative Example 8 | TRH50 60M | Medium viscosity urethane B | 2400 | 0.4 | No secondary sizing agent applied (1/400 mm/tex) | | (0.4) | Cutting->air drying |
| Example 9 | TRH50 60M | Medium viscosity urethane B | 2400 | 0.4 | 1/100 | Aqueous urethane resin E | 1.2 | Cutting->hot air drying |
| Example 10 | TRH50 60M | Medium viscosity urethane B | 2400 | 1.2 | 1/230 | Aqueous urethane resin E | 2.5 | Cutting->hot air drying |
| Example 11 | TRH50 60M | Medium viscosity urethane B | 2400 | 1.2 | 1/230 | Aqueous urethane resin E | 5.0 | Cutting->hot air drying |
| Comparative Example 9 | TRH50 60M | High viscosity urethane C | 4000 | 1.2 | Fiber bundle opening attempted at 1/440 mm/tex but fiber bundle opening was infeasible | | | — |
| Comparative Example 10 | TRH50 60M | High viscosity epoxy D | 4000 | 1.2 | Fiber bundle opening attempted at 1/440 mm/tex but fiber bundle opening was infeasible | | | — |
| Comparative Example 11 | TRH50 60M | High viscosity epoxy D | 4000 | 1.2 | 1/600 | Aqueous urethane resin E | 2.5 | Cutting->hot air drying |
| Example 12 | TRH50 60M | Low viscosity epoxy A | 50 | 1.2 | 1/230 | Aqueous polyolefin resin G | 2.5 | Cutting->hot air drying |
| Example 13 | TRH50 60M | Low viscosity epoxy A | 50 | 1.2 | 1/230 | Aqueous epoxy resin H | 2.5 | Cutting->hot air drying |

TABLE 2

| | Fiber length L (mm) | Shape of chopped carbon fibers | | | | Evaluation results | | |
|---|---|---|---|---|---|---|---|---|
| | | Longest diameter of cross-section Dmax (mm) | Shortest diameter of cross-section Dmin (mm) | Flatness ratio of cross-section (Dmax/Dmin) | L/Dmin | Bulk density (g/L) | Orientation parameter | Feed evaluation |
| Example 1 | 6.5 | 5.0 | 0.49 | 10.3 | 13.0 | 250 | 3.8 | ○ |
| Example 2 | 6.5 | 5.1 | 0.54 | 9.4 | 10.8 | 250 | 3.9 | ○ |
| Comparative Example 1 | 6.6 | 3.2 | 1.4 | 2.3 | 4.6 | 180 | 4.7 | x |
| Example 3 | 6.5 | 3.51 | 0.37 | 9.4 | 17.6 | 500 | 2.2 | ○ |
| Example 4 | 6.2 | 3.70 | 0.39 | 9.6 | 15.9 | 450 | 2.4 | ○ |
| Comparative Example 2 | Longitudinal cracks occurred in carbon fiber bundles | | | | | | | |
| Example 5 | 6.4 | 3.69 | 0.32 | 11.4 | 20.0 | 550 | 2.2 | ○ |
| Example 6 | 6.4 | 3.82 | 0.34 | 10.8 | 18.8 | 500 | 2.2 | ○ |
| Example 7 | 6.4 | 4.01 | 0.36 | 10.3 | 17.8 | 450 | 2.3 | ○ |
| Example 8 | 6.4 | 3.61 | 0.45 | 8.2 | 14.2 | 400 | 3.8 | ○ |
| Comparative Example 3 | 6.4 | 2.95 | 0.55 | 6.5 | 11.6 | 400 | 5.3 | x |
| Comparative Example 4 | 6.5 | 3.77 | 0.69 | 5.2 | 9.4 | 250 | 3.8 | x |
| Comparative Example 5 | 6.5 | 2.60 | 1.00 | 2.5 | 6.5 | 250 | 4.3 | x |
| Comparative Example 6 | 6.6 | 7.03 | 0.37 | 24.0 | 17.8 | 250 | 3.2 | x |
| Comparative Example 7 | 6.5 | 6.19 | 0.42 | 15.0 | 15.5 | 250 | 5.0 | x |
| Comparative Example 8 | Fluffing occurred upon cutting and production was infeasible | | | | | | | |
| Example 9 | 6.4 | 5.31 | 0.35 | 15.0 | 18.3 | 350 | 3.0 | ○ |
| Example 10 | 6.5 | 3.61 | 0.36 | 10.0 | 18.1 | 500 | 2.4 | ○ |
| Example 11 | 6.3 | 3.47 | 0.36 | 9.4 | 17.5 | 520 | 2.2 | ○ |
| Comparative Example 9 | — | — | — | — | — | — | — | — |
| Comparative Example 10 | — | — | — | — | — | — | — | — |
| Comparative Example 11 | 6.6 | 2.00 | 0.93 | 2.1 | 7.1 | 350 | 7.0 | x |
| Example 12 | 6.5 | 3.51 | 0.37 | 9.5 | 17.6 | 500 | 2.5 | ○ |
| Example 13 | 6.4 | 3.70 | 0.39 | 9.5 | 16.4 | 450 | 2.7 | ○ |

TABLE 3

| Name | Product item |
|---|---|
| Low viscosity epoxy A | Mixture of 50 parts by mass of 60-mol ethylene oxide adduct of bisphenol A (manufactured by Matsumoto Yushi-Seiyaku Co., Ltd.) and 50 parts by mass of 30-mol ethylene oxide adduct of bisphenol A (manufactured by Matsumoto Yushi-Seiyaku Co., Ltd.) (viscosity at 30° C. is 50 Pa × s) |
| Medium viscosity urethane B | N320 (manufactured by DIG Corp., epoxyurethane emulsion) (viscosity at 30° C. is 2400 Pa × s) |
| High viscosity urethane C | UWS-135 (manufactured by Sanyo Chemical Industries, Ltd., aqueous urethane emulsion) (viscosity at 30° C. is 4000 Pa × s) |
| High viscosity epoxy D | Mixture of 80 parts by mass of jER157S70 (manufactured by Sanyo Chemical Industries, Ltd., epoxy resin) and 20 parts by mass of NC-723-SF (manufactured by Nippon Nyukazai Co., Ltd., surfactant) (viscosity at 30° C. is 4000 Pa × s) |

TABLE 4

| Name | Product item |
|---|---|
| Aqueous urethane E | Hydran HW-930 (manufactured by DIG Corp., aqueous urethane resin) |
| Water-soluble nylon resin F | Sepolsion PA150 (manufactured by Sumitomo Seika Chemicals Co., Ltd., nylon emulsion) |
| Aqueous polyolefin resin G | Aptolok BW-5550 (manufactured by Mitsubishi Chemical Corp., aqueous polyolefin resin emulsion) |
| Aqueous epoxy resin H | jER W1155R55 (manufactured by Mitsubishi Chemical Corp., aqueous epoxy resin emulsion) |

Example 14

Carbon fiber bundles that had been adjusted to a predetermined tow width by using carbon fiber bundles TRH50 60M manufactured by Mitsubishi Rayon Co., Ltd. and having a total fineness of 32,000 dtex, and alternately passing the carbon fiber bundles through the scraping with plural fiber bundle opening bars and a tow width regulating bar, were subjected to an depositing treatment using an aqueous solution prepared with HYDRAN HW-930 (aqueous urethane resin manufactured by DIC Corp.) at a solid content concentration of 6.0% by weight (sizing liquid). The depositing treatment was carried out by a touch roll system of depositing a sizing liquid to the carbon fiber bundles by immersing a portion of a roll in the sizing liquid tank, applying the sizing liquid on the roll surface, and bringing the carbon fiber bundles into contact with the roll surface. Furthermore, the depositing treatment was carried out under the condition of 4,400 dtex/mm. Regarding the touch roll, both the front and back surfaces of the carbon fiber bundles were applied using two rolls. Cutting of the carbon fiber bundles in a wet state was carried out with a rotary cutter having an interval of cutting blades of 6 mm, and the cut carbon fiber bundles were dried at 200° C. by continuously introducing the fiber bundles into a floor vibration type hot air drying furnace, and thus chopped carbon fiber bundles were obtained.

Example 15

Chopped carbon fiber bundles were obtained in the same manner as in Example 14, except that SEPOLSION PA150 (nylon emulsion manufactured by Sumitomo Seika Chemicals Co., Ltd.) was used instead of HYDRAN HW-930 as the sizing agent. The chopped carbon fiber bundles thus obtained were subjected to the same analysis as that performed in Example 14.

Comparative Example 12

Carbon fiber bundles obtained by twisting carbon fiber bundles TRH50 60M manufactured by Mitsubishi Rayon Co., Ltd. at a rate of 10 turns per meter, were immersed in an aqueous solution prepared with HYDRAN HW-930 at a solid content concentration of 6.0% by weight (sizing liquid), and the carbon fiber bundles were passed between nip rolls. Subsequently, the carbon fiber bundles were dried by bringing the fiber bundles into contact for 10 seconds with a heating roll having the surface temperature adjusted to 140° C., and thus carbon fiber bundles were obtained. The carbon fiber bundles thus obtained were cut with a rotary cutter having an interval of cutting blades of 6 mm, and thus chopped carbon fiber bundles were obtained. The chopped carbon fiber bundles thus obtained were subjected to the same analysis as that performed in Example 14.

The results of the above analyses are presented in Table 5. Since the carbon fiber bundles of Examples 14 and 15 had cross-sections having a flat shape, even if the amount of deposit of the sizing agent was relatively low, the sizing agent was applied uniformly. Thus, chopped carbon fiber bundles having satisfactory product quality could be produced with high productivity.

On the other hand, the chopped carbon fiber bundles of Comparative Examples that were twisted had low flatness, and thus the chopped carbon fiber bundles had a low bulk density.

INDUSTRIAL APPLICABILITY

The chopped carbon fiber bundle of the present invention can exhibit excellent processability and handleability in a process of compounding with a matrix resin, and when the chopped carbon fiber bundle is used, a molded product having excellent mechanical characteristics is obtained. Furthermore, since the chopped carbon fiber bundle of the present invention has a flat shape, productivity for the production of chopped carbon fiber bundles is increased to a large extent.

The invention claimed is:

1. A chopped carbon fiber bundle comprising:
    a carbon fiber bundle having a total fineness of from 25,000 dtex to 45,000 dtex; and
    a sizing agent in an amount of from 1% by mass to 5% by mass relative to the total mass of the chopped carbon fiber bundle,
    wherein
    a length (L) of the chopped carbon fiber bundle along the fiber direction of the carbon fiber bundle is from 1 mm to 50 mm,
    a ratio (Dmax/Dmin) of the longest diameter (Dmax) and the shortest diameter (Dmin) of a cross-section perpendicular to the fiber direction of the chopped carbon fiber bundle is from 6.0 to 18.0, and
    an orientation parameter of single fibers present at the surface of the chopped carbon fiber bundle is 4.0 or less.

2. The chopped carbon fiber bundle according to claim 1, wherein the ratio (L/Dmin) of the length (L) along the fiber direction of the chopped carbon fiber bundle and the shortest diameter (Dmin) of a cross-section perpendicular to the fiber direction of the chopped carbon fiber bundle is from 5 to 30.

3. The chopped carbon fiber bundle according to claim 1, wherein a bulk density of the chopped carbon fiber bundle is from 200 g/L to 650 g/L.

4. The chopped carbon fiber bundle according to claim 1, wherein the sizing agent comprises at least one thermoplastic resin selected from the group consisting of a urethane-based resin, a nylon-based resin, a modified olefin-based resin, a modified epoxy-based resin, and a water-soluble nylon-based resin.

TABLE 5

| | Raw material | Sizing agent | | Shape of chopped fibers | | | | | |
| | | | | Fiber | Major axis | Minor axis | | | |
| | carbon fiber Product kind | Kind | Amount of adhesion (wt %) | length L (mm) | Dmax of cross-section (mm) | Dmin of cross-section (mm) | Dmax/Dmin | L/Dmin | Bulk density (g/L) |
|---|---|---|---|---|---|---|---|---|---|
| Example 14 | TRH50 60M | Urethane | 3.2 | 6.5 | 5 | 0.5 | 10.3 | 13 | 250 |
| Example 15 | TRH50 60M | Nylon | 3.6 | 6.5 | 5.1 | 0.6 | 9.4 | 10.8 | 250 |
| Comparative Example 12 | TRH50 60M | Urethane | 2.6 | 6.6 | 3.2 | 1.4 | 2.3 | 4.6 | 180 |

5. The chopped carbon fiber bundle according to claim 3, wherein the sizing agent comprises at least one thermoplastic resin selected from the group consisting of a urethane-based resin, a nylon-based resin, a modified olefin-based resin, a modified epoxy-based resin, and a water-soluble nylon-based resin.

* * * * *